(12) United States Patent
Lee et al.

(10) Patent No.: US 11,756,475 B2
(45) Date of Patent: Sep. 12, 2023

(54) VISUAL EFFECTS MANAGEMENT SYSTEM AND METHOD

(71) Applicant: Dell Products, L.P., Round Rock, TX (US)

(72) Inventors: Siew Fei Lee, Singapore (SG); Bee June Tye, Singapore (SG); Lei Guo, Singapore (SG)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 17/455,701

(22) Filed: Nov. 19, 2021

(65) Prior Publication Data
US 2023/0162654 A1    May 25, 2023

(51) Int. Cl.
*G09G 3/20* (2006.01)

(52) U.S. Cl.
CPC ... G09G 3/2096 (2013.01); *G09G 2320/0606* (2013.01); *G09G 2340/02* (2013.01); *G09G 2354/00* (2013.01)

(58) Field of Classification Search
CPC .................. G09G 2320/0606; G09G 2340/12
See application file for complete search history.

(56) References Cited

U.S. PATENT DOCUMENTS

| | | | |
|---|---|---|---|
| 2009/0165145 A1* | 6/2009 | Haapsaari | H04L 67/306 726/28 |
| 2014/0237365 A1* | 8/2014 | Oberbrunner | H04N 21/437 715/722 |
| 2019/0346885 A1* | 11/2019 | Sepulveda | G06F 3/0482 |
| 2021/0218416 A1* | 7/2021 | Yen | H01H 13/705 |
| 2023/0081535 A1* | 3/2023 | Xiong | G09G 5/373 345/698 |

* cited by examiner

*Primary Examiner* — Samantha (Yuehan) Wang
(74) *Attorney, Agent, or Firm* — Fogarty LLP

(57) ABSTRACT

Systems and methods for applying visual effects to a display are disclosed. In some embodiments, an Information Handling System (IHS) may include one or more processors and a memory coupled to the one or more processors, the memory including program instructions stored thereon that, upon execution by the one or more processors, cause the IHS to: receive a request to select one visual effect profile from among a plurality of visual effect profiles, each of the visual effect profiles comprising information associated with one or more visual effects that are configured to be applied to a video stream, and overlay the one or more visual effects onto a video stream, the video stream transmitted to a display for view by a user.

18 Claims, 6 Drawing Sheets

VISUAL EFFECTS MANAGEMENT SYSTEM AND METHOD

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Certain IHSs, such as gaming systems, media players and the like can establish graphics and/or video outputs for displays and other video systems. For example, an IHS can provide various graphical user interface elements to a video monitor that displays the graphical user interface elements to a user. Gaming systems can interface with monitors, televisions, or virtual reality displays, among others. These user systems include video processor elements, such as graphics cards, graphics processing cores, as well as various display interface circuitry and connectors. However, as popularity with high-performance gaming and video-intensive virtual or augmented reality systems have increased, so has the need for managing the level and content of video imagery generated by the gaming systems.

SUMMARY

Systems and methods for applying visual effects to a display are disclosed. In some embodiments, an Information Handling System (IHS) may include one or more processors and a memory coupled to the one or more processors, the memory including program instructions stored thereon that, upon execution by the one or more processors, cause the IHS to receive a request to select one visual effect profile from among a plurality of visual effect profiles, each of the visual effect profiles comprising information associated with one or more visual effects that are configured to be applied to a video stream, and overlay the one or more visual effects onto a video stream, the video stream transmitted to a display for view by a user. In some embodiments, the teachings of the present disclosure may provide a system and method for in-game Heads-Up-Display (HUD) in display devices.

According to another embodiment, a visual effect management method includes the steps of receiving a request to select one visual effect profile from among a plurality of visual effect profiles, and overlaying the one or more visual effects onto a video stream, the video stream transmitted to a display for view by a user. Each of the visual effect profiles including information associated with one or more visual effects that are configured to be applied to a video stream.

According to yet another embodiment, a hardware memory device has computer-executable instructions stored thereon that, upon execution by a processor of a display, cause the instructions to receive a request to select one visual effect profile from among a plurality of visual effect profiles, and overlay the one or more visual effects onto a video stream. The video stream is also transmitted to a display for view by a user. Each of the visual effect profiles include information associated with one or more visual effects that are configured to be applied to a video stream.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
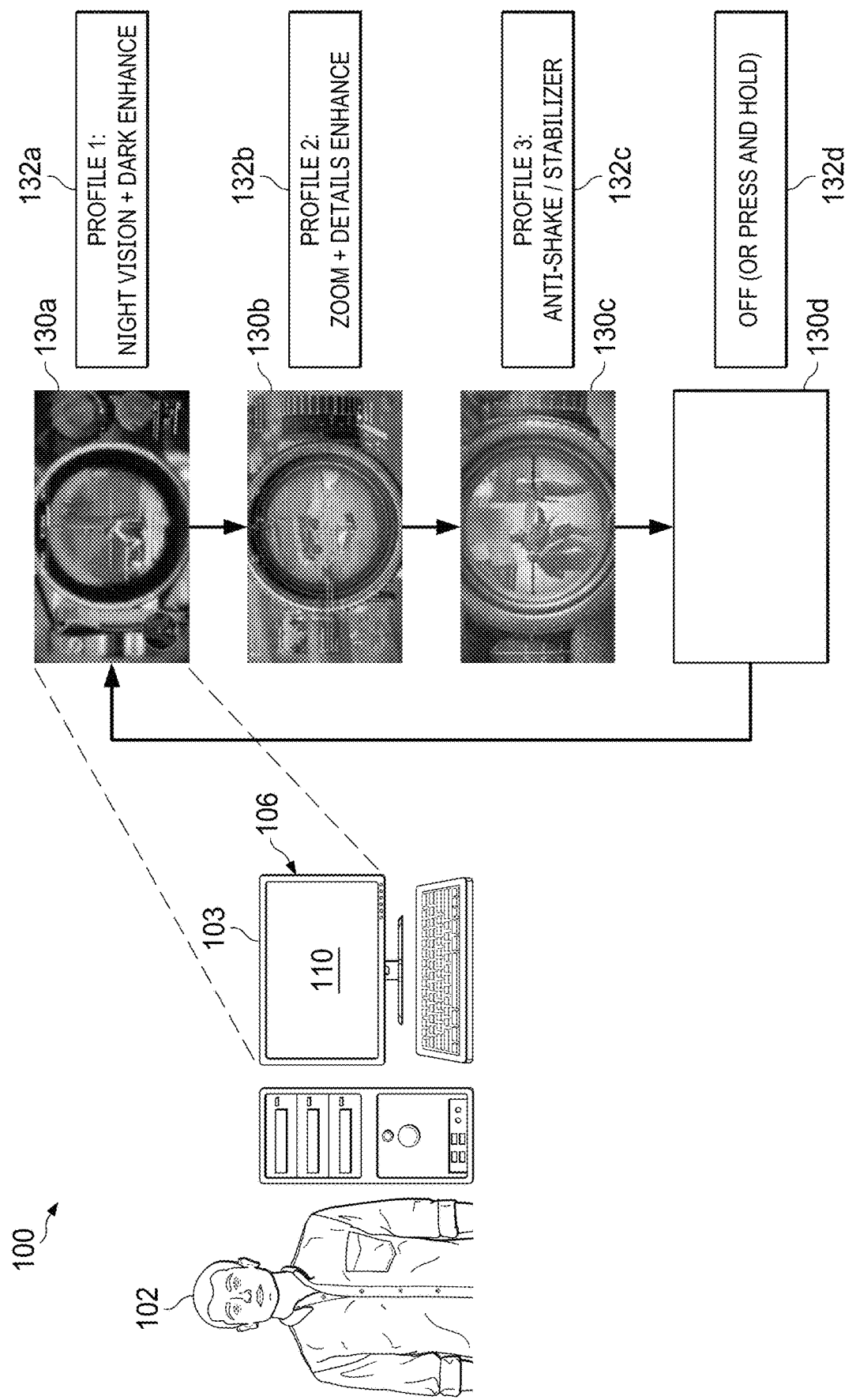
FIG. 1 illustrates an example visual effect management system that may be used to impart user-supplied visual effects on a display of IHS according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Corresponding numerals and symbols in the different figures generally refer to corresponding parts, unless otherwise indicated. The figures are not necessarily drawn to scale. In the drawings, like reference numerals refer to like elements throughout, and the various features are not necessarily drawn to scale. In the following discussion and in the claims, the terms "including," "includes," "having," "has," "with," or variants thereof are intended to be inclusive in a manner similar to the term "comprising," and thus should be interpreted to mean "including, but not limited to . . . " Also, the terms "coupled," "couple," and/or or "couples" is/are intended to include indirect or direct electrical or mechanical connection or combinations thereof. For example, if a first device couples to or is electrically coupled with a second device that connection may be through a direct electrical connection, or through an indirect electrical connection via one or more intervening devices and/or connections. Terms such as "top," "bottom," "front," "back," "over," "above," "under," "below," and such, may be used in this disclosure. These terms should not be construed as limiting the position or orientation of a structure or element, but should be used to provide spatial relationship between structures or elements.

Embodiments of the present disclosure are directed to a system and method for imparting visual effects onto imagery that is displayed on monitors of IHSs. Conventionally, control of imagery with game applications (e.g., in-games) are often proprietary to the applications (e.g., games) that use such devices. Developers who create the applications only offer limited customization of the imagery generated by the applications. For example, games may only provide certain visual effects, such as telescopic zoom, or display of simulated speed, fuel, altitude, aim reticle(s), and the like. They, however, do not offer effective and dynamic visual enhancement to imagery that improves a user's visual experience during gameplay. Any adjustments (e.g., brightness, contrast, gamma, etc.) that could otherwise be made are often required to be applied to the whole screen. But these whole screen adjustments often cause wash-out on screen elements and, in some cases, cause over-exposure and/or under-exposure of the imagery. Moreover, making such adjustments to these parameters can often be disruptive, counter intuitive, and/or non-dynamic. Worse, these adjustments are often required to be performed using "trial-and-error" techniques.

As will be described in detail herein below, the visual effect management system and method described herein implements visual effects that can be overlaid with a combination of filters and masks on a display. The mix of filters and masks enhances the visual experience based on actual scenes during use of the display. Some embodiments of the visual effect management system and method may use shortcut keys that provide fast and easy activation of certain visual effects using a single press operation.

FIG. 1 illustrates an example visual effect management system 100 that may be used to impart user-supplied visual effects on a display 106 of IHS 103 according to one embodiment of the present disclosure. According to one embodiment, the visual effect management system 100 may provide configurable visual effect profiles 132a-d that may be swiftly selected or cycled using a single key visual effect profile changing procedure. Additionally, the visual effect profiles may be individually customized to suit the user's desired visual effects. The visual effect profiles may be configured in any suitable manner. In one embodiment, the visual effect management system 100 may be configured using an On Screen Display (OSD) or via a user interface displayed on the IHS 103 for a user 102.

The application may be any type that generates imagery for display on the display 106. For example, the application may be a game, such as an interactive game where the user reacts using one or more interface devices to the imagery displayed on the display 106.

Any suitable type of visual effects may be implemented on the visual effect management system 100. Examples of such visual effects may include image enhancements, such as dark area contrast, and sharpness filters. The visual effects may also include image manipulation features, such as zooming in or out, and image stabilization. Other visual effects may include navigation features that are displayed on the display, such as relative orientation, waypoint guidance based on visual objects, heatmaps, object isolation and detection, warm/cool region detection, and layering, color remapping, overlay masking, night/day adjustments, and transparency.

The different visual effect profiles 132a-d may generate different types of imagery 130a-d generated on the display 106. For example, a first visual effect profile 132a may impart a night vision visual effect and a dark enhance visual effect when the imagery 130a generated by the application simulates a night vision condition. The second visual effect profile 132b may impart a zoom visual effect and an enhanced detail visual effect when the imagery 130b generated by the application simulates a wide angle view in which certain regions of the imagery are to be expanded or made to appear larger by the user. The third visual effect profile 132c may impart an anti-shake visual effect and a stabilizer visual effect when the imagery 130c generated by the application simulates a movement condition in which excessive shake of the imagery is unwanted. The fourth visual effect profile 132d may impart a blanking visual effect when the imagery 130d generated by the application is unwanted, such as when the user desires to temporarily halt operation of the application for a period of time.

In one embodiment, selection of either of the visual effect profiles 132a-d may be provided by one or more shortcut keys 134 that may be actuated by the user. For example, selection of either of the visual effect profiles 132a-d may be provided by a shortcut key for each visual effect profile 132a-d. As another example, selection of any visual effect profiles 132a-d may be provided by a single shortcut key that sequentially selects the next visual effect profile 132a-d each time it is pressed. Furthering this example, if the single shortcut key is pressed when visual effect profile 132d is being used, the system 100 may revert to using the first visual effect profile 132a.

In another embodiment, selection of either visual effect profile 132a-d may be provided by an On Screen Display (OSD) rendered on the display 106. For example, the display 106 may include a button or other device that triggers the display 106 to display a user interface directly on the display 106 so that the user may select either profile 132a-d to be applied to the imagery displayed by the application.

The visual effect profiles 132a-d may be overlaid on the display 106 in any suitable manner. In one embodiment, the video effect profiles 132a-d may be overlaid by the visual effect management system 100 by communicating with a scalar device 110 (e.g., a Liquid Crystal Display or "LCD" controller coupled to a memory having program instructions stored thereon and mounted on a Printed Control Board or "PCB") configured in the display 106. In general, the scalar device 110 is often included with most displays for converting different video signals (e.g., HDMI, VGA, DisplayPort, etc.) into a format that can be used to generate pixels on the display 106. The scalar device 110 may also include image processing capabilities to manipulate how those pixels are generated on the display 106. The visual effect management system 100 may communicate with the scalar device 110 to alter how the video effect profiles 132a-d manipulates the video imagery that is displayed on the display 106.

Figure 2:
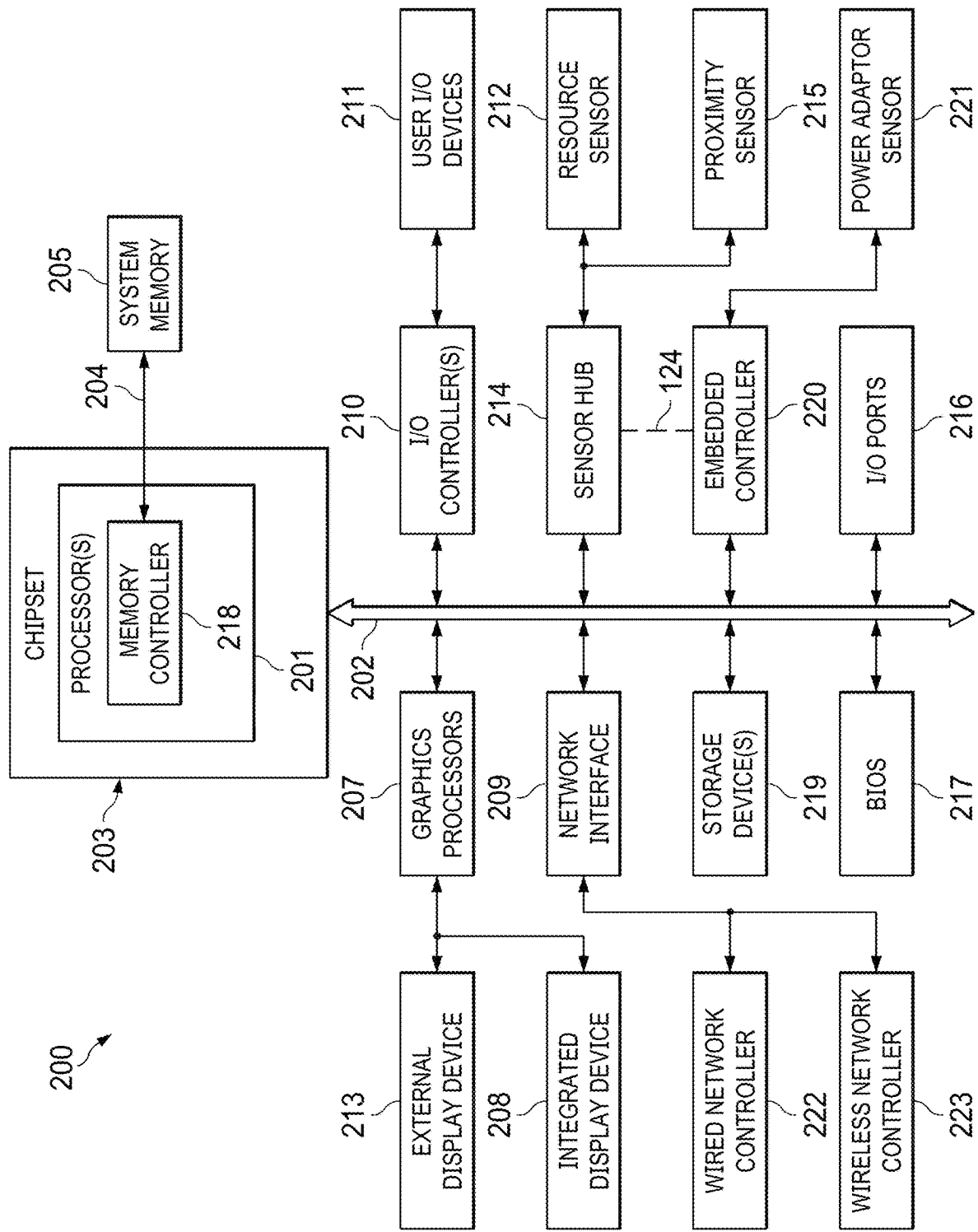
FIG. 2 is a block diagram illustrating components of an IHS configured to implement embodiments of the adaptive log level control system and method according to one embodiment of the present disclosure.

FIG. 2 is a block diagram illustrating components of an IHS 200 configured to implement embodiments of the adaptive log level control system and method according to one embodiment of the present disclosure. IHS 200 may be incorporated in whole, or part, as IHS 103 of FIG. 1. As shown, IHS 200 includes one or more processors 201, such as a Central Processing Unit (CPU), that execute code retrieved from system memory 205. Although IHS 200 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 200 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 200 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 200, bus 202 is illustrated as a single element. Various embodiments may utilize any number of separate buses to provide the illustrated pathways served by bus 202.

In various embodiments, IHS 200 may include one or more I/O ports 216 that may support removable couplings with various types of external devices and systems, including removable couplings with peripheral devices that may be configured for operation by a particular user of IHS 200. For instance, I/O ports 216 may include USB (Universal Serial Bus) ports, by which a variety of external devices may be coupled to IHS 200. In addition to or instead of USB ports, I/O ports 216 may include various types of physical I/O ports that are accessible to a user via the enclosure of the IHS 200.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 200 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 200. User I/O devices 211 may interface with an I/O controller 210 through wired or wireless couplings supported by IHS 200.

In some cases, I/O controllers 210 may support configurable operation of supported peripheral devices, such as user I/O devices 211.

As illustrated, a variety of additional resources may be coupled to the processor(s) 201 of the IHS 200 through the chipset 203. For instance, chipset 203 may be coupled to network interface 209 that may support different types of network connectivity. IHS 200 may also include one or more Network Interface Controllers (NICs) 222 and 223, each of which may implement the hardware required for communicating via a specific networking technology, such as Wi-Fi, BLUETOOTH, Ethernet, and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support different types of network connectivity, such as the network connectivity utilized by IHS 200.

Chipset 203 may also provide access to one or more display device(s) 208 and 213 via graphics processor 207. Graphics processor 207 may be included within a video card, graphics card or within an embedded controller installed within IHS 200. Additionally, or alternatively, graphics processor 207 may be integrated within processor 201, such as a component of a system-on-chip (SoC). Graphics processor 207 may generate display information and provide the generated information to one or more display device(s) 208 and 213, coupled to IHS 200.

One or more display devices 208 and 213 coupled to IHS 200 may utilize LCD, LED, OLED, or other display technologies. Each display device 208 and 213 may be capable of receiving touch inputs such as via a touch controller that may be an embedded component of the display device 208 and 213 or graphics processor 207, or it may be a separate component of IHS 200 accessed via bus 202. In some cases, power to graphics processor 207, integrated display device 208 and/or external display device 213 may be turned off, or configured to operate at minimal power levels, in response to IHS 200 entering a low-power state (e.g., standby).

As illustrated, IHS 200 may support an integrated display device 208, such as a display integrated into a laptop, tablet, 2-in-1 convertible device, or mobile device. IHS 200 may also support use of one or more external display device 213, such as external monitors that may be coupled to IHS 200 via various types of couplings, such as by connecting a cable from the external display device 213 to external I/O port 216 of the IHS 200. In certain scenarios, the operation of integrated displays 208 and external displays 213 may be configured for a particular user. For instance, a particular user may prefer specific brightness settings that may vary the display brightness based on time of day and ambient lighting conditions. In one embodiment, the integrated display device 208 and/or external display device 213 may include a scalar device 110 that can be used to manipulate video imagery that is displayed on a monitor.

Chipset 203 also provides processor 201 with access to one or more storage devices 219. In various embodiments, storage device 219 may be integral to IHS 200 or may be external to IHS 200. In certain embodiments, storage device 219 may be accessed via a storage controller that may be an integrated component of the storage device. Storage device 219 may be implemented using any memory technology allowing IHS 200 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 200 also includes Basic Input/Output System (BIOS) 217 that may be stored in a non-volatile memory accessible by chipset 203 via bus 202. Upon powering or restarting IHS 200, processor(s) 201 may utilize BIOS 217 instructions to initialize and test hardware components coupled to the IHS 200. BIOS 217 instructions may also load an operating system (OS) (e.g., WINDOWS, MACOS, iOS, ANDROID, LINUX, etc.) for use by IHS 200.

BIOS 217 provides an abstraction layer that allows the operating system to interface with the hardware components of the IHS 200. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 200 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 200 (e.g., CPU 201, GPU 207, system memory 205, etc.). In certain embodiments, sensor hub 214 may also include capabilities for determining a location and movement of IHS 200 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 200, absence from IHS 200, and/or distance from IHS 200 (e.g., near-field, mid-field, or far-field).

In certain embodiments, sensor hub 214 may be an independent microcontroller or other logic unit that is coupled to the motherboard of IHS 200. Sensor hub 214 may be a component of an integrated system-on-chip incorporated into processor 201, and it may communicate with chipset 203 via a bus connection such as an Inter-Integrated Circuit ($I^2C$) bus or other suitable type of bus connection. Sensor hub 214 may also utilize an $I^2C$ bus for communicating with various sensors supported by IHS 200.

As illustrated, IHS 200 may utilize embedded controller (EC) 220, which may be a motherboard component of IHS 200 and may include one or more logic units. In certain embodiments, EC 220 may operate from a separate power plane from the main processors 201 and thus the OS operations of IHS 200. Firmware instructions utilized by EC 220 may be used to operate a secure execution system that may include operations for providing various core functions of IHS 200, such as power management, management of operating modes in which IHS 200 may be physically configured and support for certain integrated I/O functions.

EC 220 may also implement operations for interfacing with power adapter sensor 221 in managing power for IHS 200. These operations may be utilized to determine the power status of IHS 200, such as whether IHS 200 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 124.

In various embodiments, IHS 200 may not include each of the components shown in FIG. 2. Additionally, or alternatively, IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
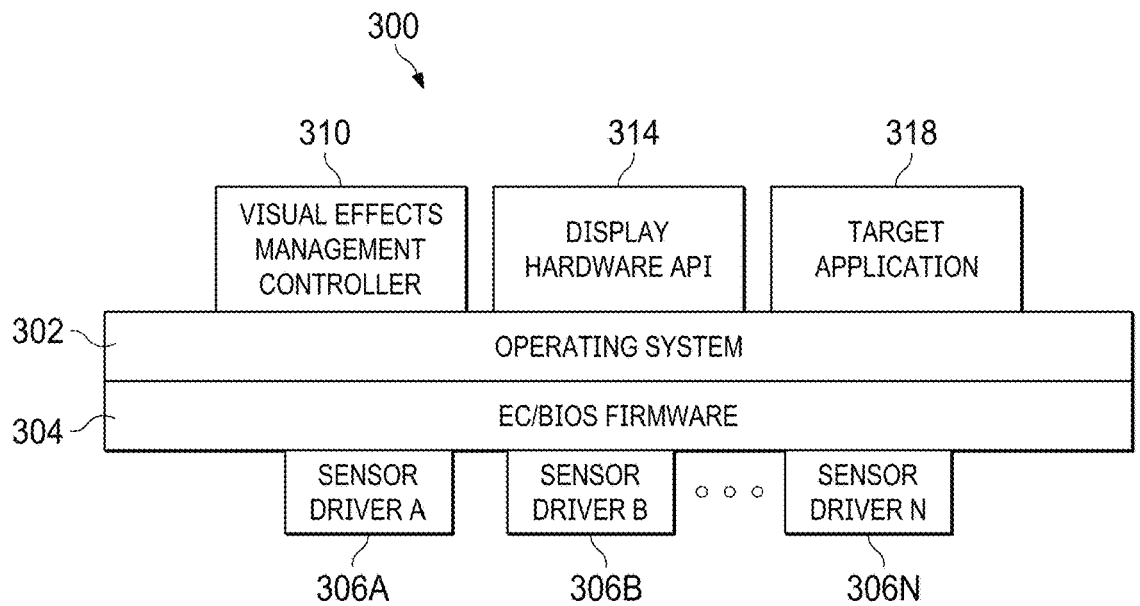
FIG. 3 is a block diagram illustrating an example of a software system produced by IHS for managing visual effects according to one embodiment of the present disclosure.

FIG. 3 is a block diagram illustrating an example of a software system 300 produced by IHS 200 for managing visual effects according to one embodiment of the present disclosure. In some embodiments, each element of software system 300 may be provided by IHS 200 through the execution of program instructions by one or more logic components (e.g., processors 201, BIOS 217, EC 220, etc.) stored in memory (e.g., system memory 205) and/or storage device(s) 219. As shown, software system 300 includes a visual effects management controller 310 configured to manage visual effects imparted onto a video stream generated by an application 318.

Both visual effects management controller 310 and application 318 are executed by an OS 302, which is in turn supported by EC/BIOS instructions/firmware 304. EC/BIOS firmware 304 is in communications with, and configured to receive data collected by, one or more sensor modules or drivers 306A-306N, which may abstract and/or interface with hardware resource sensor 212, proximity sensor 215, and power adapter sensor 221, for example. In some embodiments, drivers 306A-306N, may be configured to receive user input from a keyboard, mouse, and/or touch screen display for configuring the operation of the visual effects management controller 310.

The visual effects management controller 310 communicates with the display hardware API 314 to impart user-supplied visual effects to the imagery 130a-d that is displayed on the display 106 of the IHS 200. In other embodiments, the visual effects management controller 310 communicates with a scalar device 110 configured in the display 106 to render video imagery that is displayed to the user, such as described above with reference to FIG. 1.

The display hardware API 314 may be used by the application 318 to convert digital signals or code to a form that may be displayed on the display 106. For example, the display hardware API 314 may use a Graphical Processing Unit (GPU) configured on the IHS 103 to manipulate digital signals generated by the application 318. The visual effects management controller 310 may be configured to overlay certain visual effects on the imagery by communicating with the display hardware API 314 to manipulate how the imagery is overlaid with the visual effects. It may be important to note that the actions of the visual effects management controller 310 is generally independent of how the application 318 accesses the display hardware API 314. Thus, the visual effects management controller 310 may be configured to manipulate imagery independently of how the application 318 generates the imagery for display on the display 106. In one embodiment, the visual effects management controller 310 may generate an OSD on the display 106 that displays a list of available visual effect profiles, and by processing a gaze vector of the user's eyes, determine which visual effect profile is to be selected. In one embodiment, the visual effects management controller 310 includes at least a part of a Scalar Controller device provided by the DELL CORPORATION.

Figure 4:
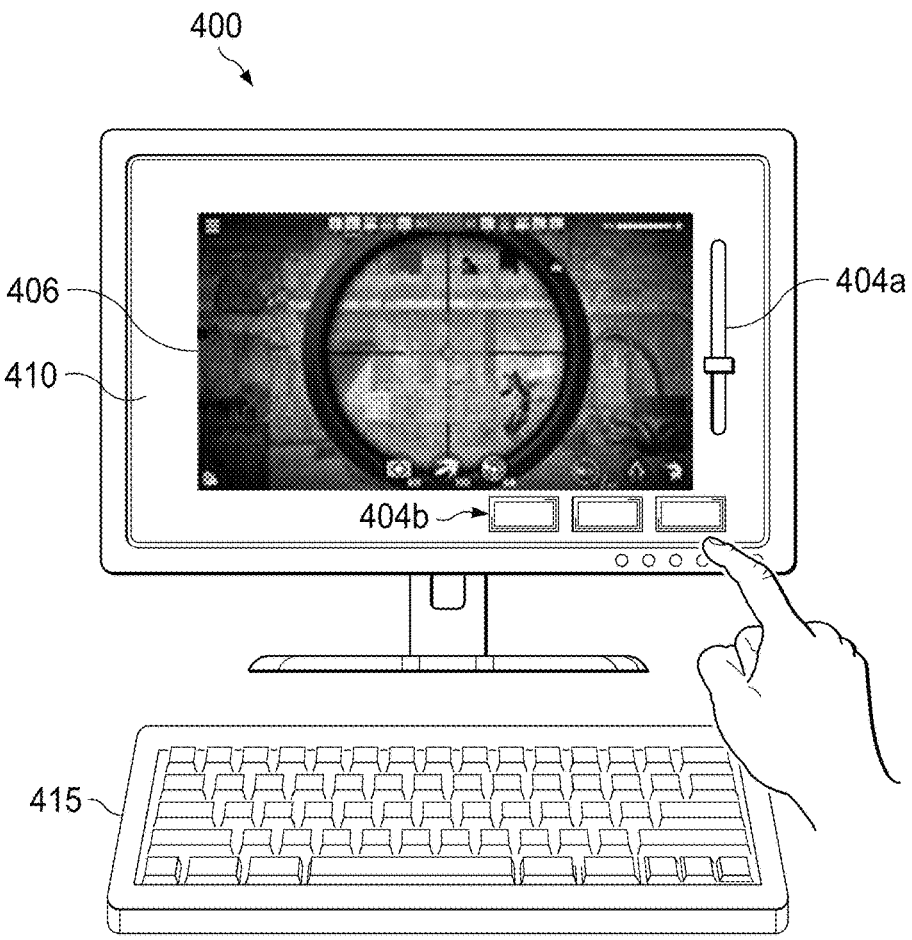
FIG. 4 illustrates an example video screen that may be displayed on a computer monitor by the visual effects management controller according to one embodiment of the present disclosure.

FIG. 4 illustrates an example video screen that may be displayed on a computer monitor 400 by the visual effects management controller 310 according to one embodiment of the present disclosure. In one embodiment, the visual effects management controller 310 may incorporate a display mode in which certain configurable aspects of the application 318 are displayed as selectable icons, such as a slider bar 404a, and/or one or more buttons 404b on a backdrop portion 410 of the monitor 400. For example, the monitor 400 may be a touch screen monitor that enables the user to configure various aspects of the application 318 and/or the video stream 406 using the selectable icons 404.

Additionally, the video image 406 generated on the display screen by the visual effects management controller 310 may comprise a portion of the overall display area of the monitor 400. That is, the visual effects management controller 310 may apply the visual effects to only a portion of the monitor's display area. In one embodiment, the size, shape, and/or location of the video image 406 on the display screen is configurable by a user. That is, the visual effects management controller 310 may be configured to receive user input for making the video image 406 larger, smaller, or moved to a different location on the display screen. In some cases, the screen may be partitioned into 3×3 regions (e.g., boxes, rectangles, or squares of pixels, etc.), and stabilization/processing/effects may be performed on the center box (or on a set of boxes) to the exclusion of other boxes. One particular example of such a video screen may include a AlienEye HUD mode application provided by the DELL CORPORATION. In some cases, different versions of the controller 310 may be provided to the user. For example, one version of the controller 310 may include a 'Lite' version in which the configuration is hardcoded when delivered to the user.

The visual effects management controller 310 also provides configurable shortcut keys on a keyboard 415 for the user. For example, the visual effects management controller 310 may receive user input to configure a certain key, such as a function key (e.g., 'F8'), or a combination of keys (e.g., 'Control'+'F10') that may be used by the visual effects management controller 310 to perform various tasks, such as entering a setup mode for the system, selecting a certain video filter, and the like. In some embodiments, other user input devices, such as mice, gamepads, and external source devices like game consoles and wireless dongles streaming from gaming clouds may be used.

Figure 5:
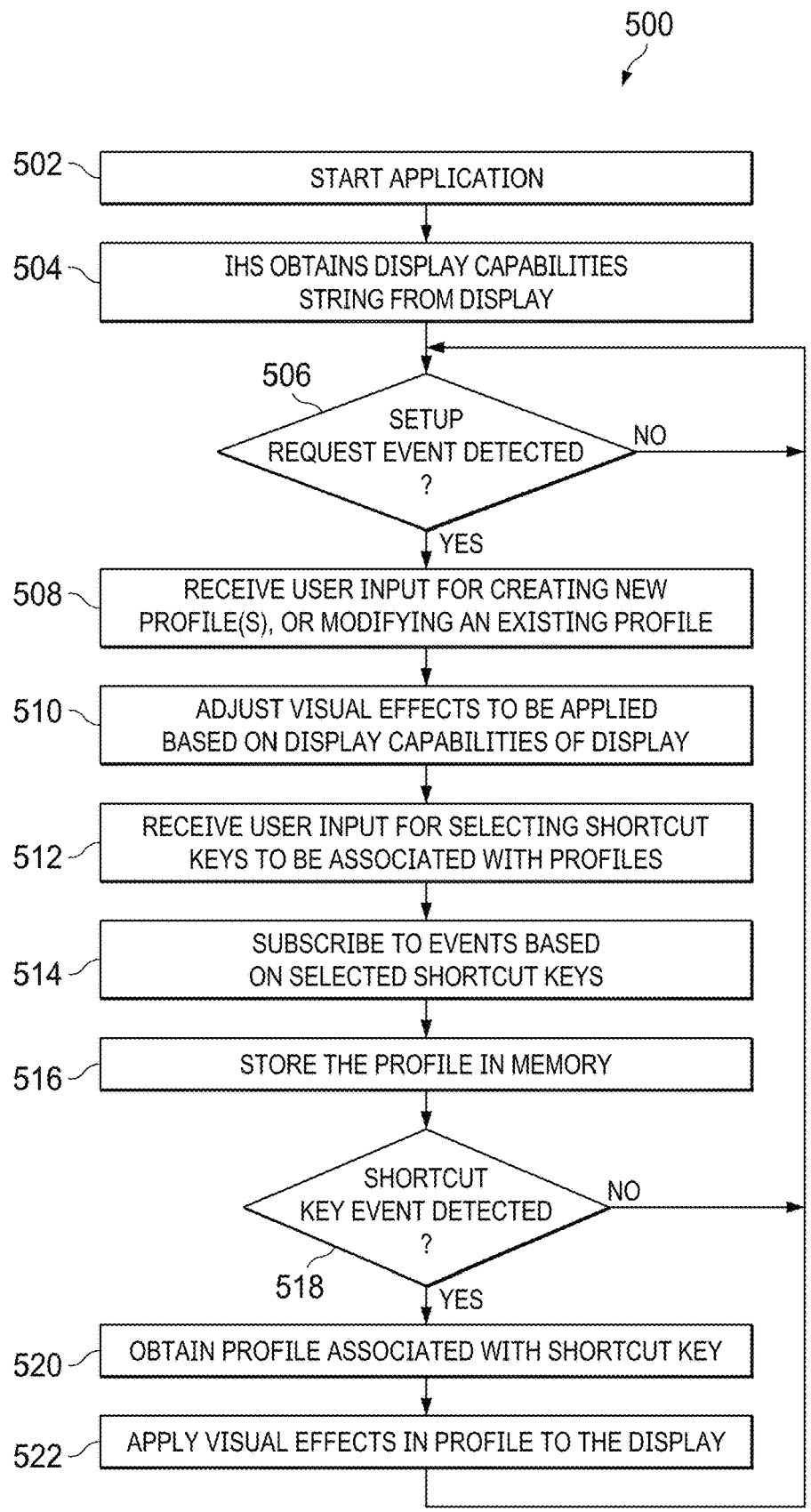
FIG. 5 illustrates an example of method for managing visual effects that may be overlaid on a display according to one embodiment of the present disclosure.

FIG. 5 illustrates an example of method 500 for managing visual effects that may be overlaid on a display 106 according to one embodiment of the present disclosure. In some embodiments, method 500 may be performed by system 300 of FIG. 3 in response to the execution of program instructions stored in a hardware memory.

At step 502, the application 318 is started. Thereafter at step 504, the IHS 103 obtains display capabilities from the display 106. The display capabilities may include, for example, a maximum resolution (e.g., pixel count) of the display, contrast ratio, aspect ratio, refresh rate, response time, maximum brightness, and the like.

At step 506, the method 500 determines whether or not a setup request event is detected. Nevertheless, if the setup request event is detected, processing continues at step 508 to setup the various features of the system; otherwise, processing continues monitoring (e.g., polling) for user input at step 506.

At step 508, the method 500 receives user input for creating new profiles, or modifying an existing profile. For example, the method 500 may generate a Graphical User Interface (GUI) on the display of the IHS 103 or on the display 106 for selecting the type of visual effects and the level of how those visual effects are to be applied. The method 500 may also enable user input for selecting a particular shortcut key to be used for each visual effect profile generated. Additional information about GUIs that may be generated by the method 500 will be described in detail herein below with reference to FIGS. 6A and 6B.

At step 510, the method 500 adjusts the visual effects to be applied based on display capabilities of display. For example, the method 500 may assign a certain weighting level to a visual effect feature based on the display capabilities received at step 504. Furthering this example, if the maximum resolution (e.g., raster size) of the display 106 is a limited size, the method 500 may limit the level of a zoom visual effect that may be applied based on the limited available resolution of the display 106. As another example, if the method 500 detects that the video imagery displayed on the display 106 has a relatively good contrast ratio, it may allow relatively large changes in contrast visual effects to be applied.

At step 512, the method 500 receives user input for selecting shortcut keys to be associated with the profiles generated at step 510. The shortcut keys may include any mechanism that triggers the method 500 to apply the visual effect profile associated with the shortcut key to the imagery displayed on the display 106. Examples of suitable shortcut keys may include, for example, keys on the keyboard of the IHS 103, selectable button or icons on the OSD display by the display 106.

At step 514, the method 500 subscribes to receive notifications for the selected shortcut keys. For example, the method 500 may communicate with the OS of the IHS 103 to receive a notification when a certain function key (e.g., 'F10'), which was selected earlier to be associated with a certain visual effect profile, is pressed by a user. Thereafter at step 516, the method 500 stores the profile in memory. For example, the method 500 may store the profile information in a portion of the system memory of the IHS 103.

Steps 518-522 generally refer to actions that may be taken by the method 500 to process shortcut key events that occur on the IHS 103. At step 518, the method 500 determines whether or not a shortcut key event has occurred. If so, processing continues at step 520; otherwise, processing continues at step 506 to continue monitoring for user input.

At step 520, the method 500 obtains a profile associated with the selected shortcut key. For example, the method 500 may retrieve the profile that was stored earlier at step 516. The method 500 then applies the visual effects in the retrieved profile to the display 106. For example, the method 500 may communicate with the display hardware API 314 to adjust how the imagery from the application is applied to the display 106. When the method 500 has processed step 522, it continues processing at step 506 to continue monitoring for user input associated with the operation of the system.

The method 500 may be repeatedly performed for continual application different visual effects to the display 106. Nevertheless, when use of the method 500 is no longer needed or desired, the method 500 ends.

Although FIG. 5 describes an example method that may be performed to apply different visual effects to a display 106, the features of the method 500 may be embodied in other specific forms without deviating from the spirit and scope of the present disclosure. For example, the method 500 may perform additional, fewer, or different operations than those described in the present examples. As another example, certain steps of the aforedescribed method 500 may be performed in a sequence different from that described above. As yet another example, certain steps of the method 500 may be performed by other components in the IHS 103 other than those described above.

Figure 6A:
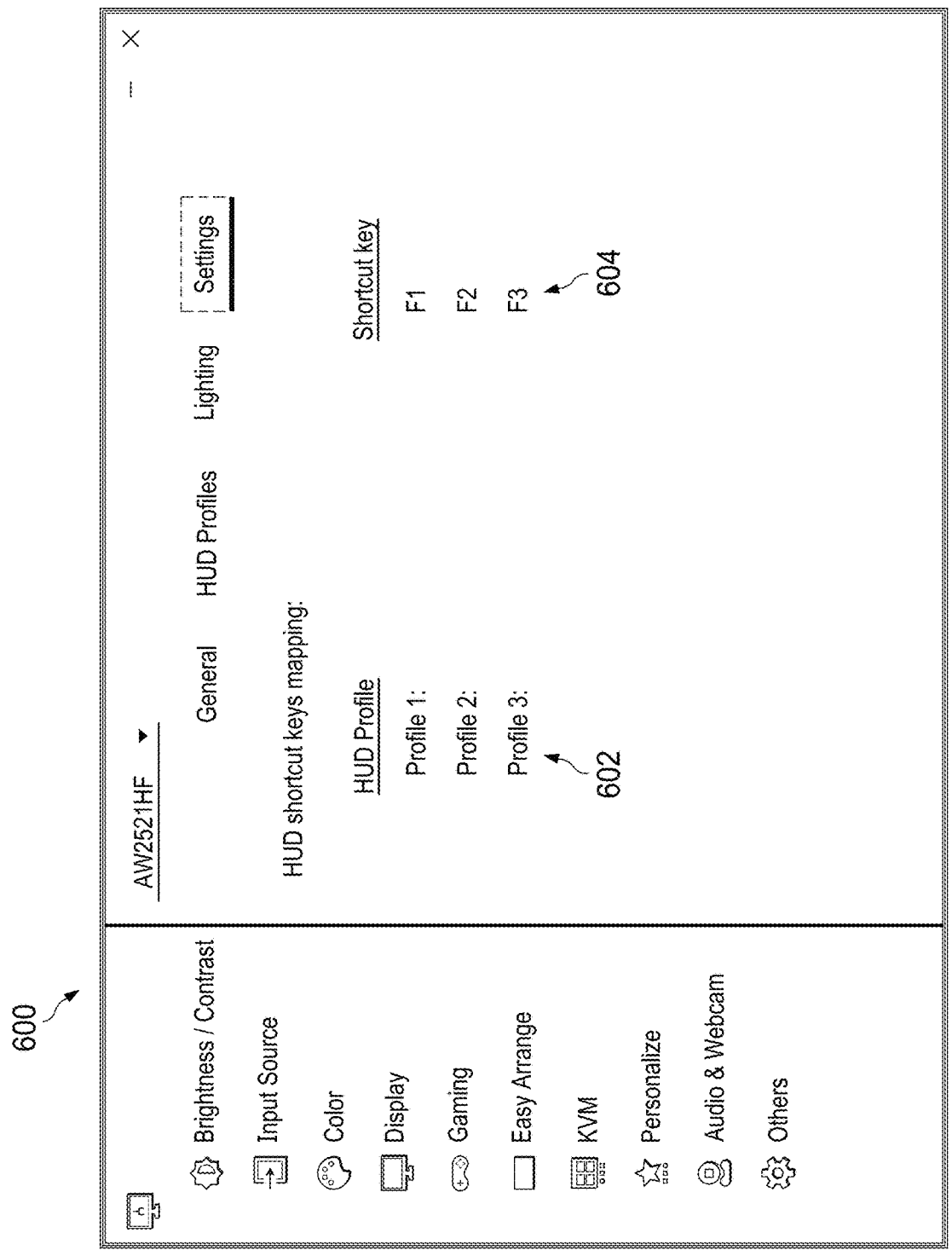
FIGS. 6A and 6B illustrate example user interface screens that may be generated by the visual effect management system and method to interact with the user according to one embodiment of the present disclosure.
Figure 6B:
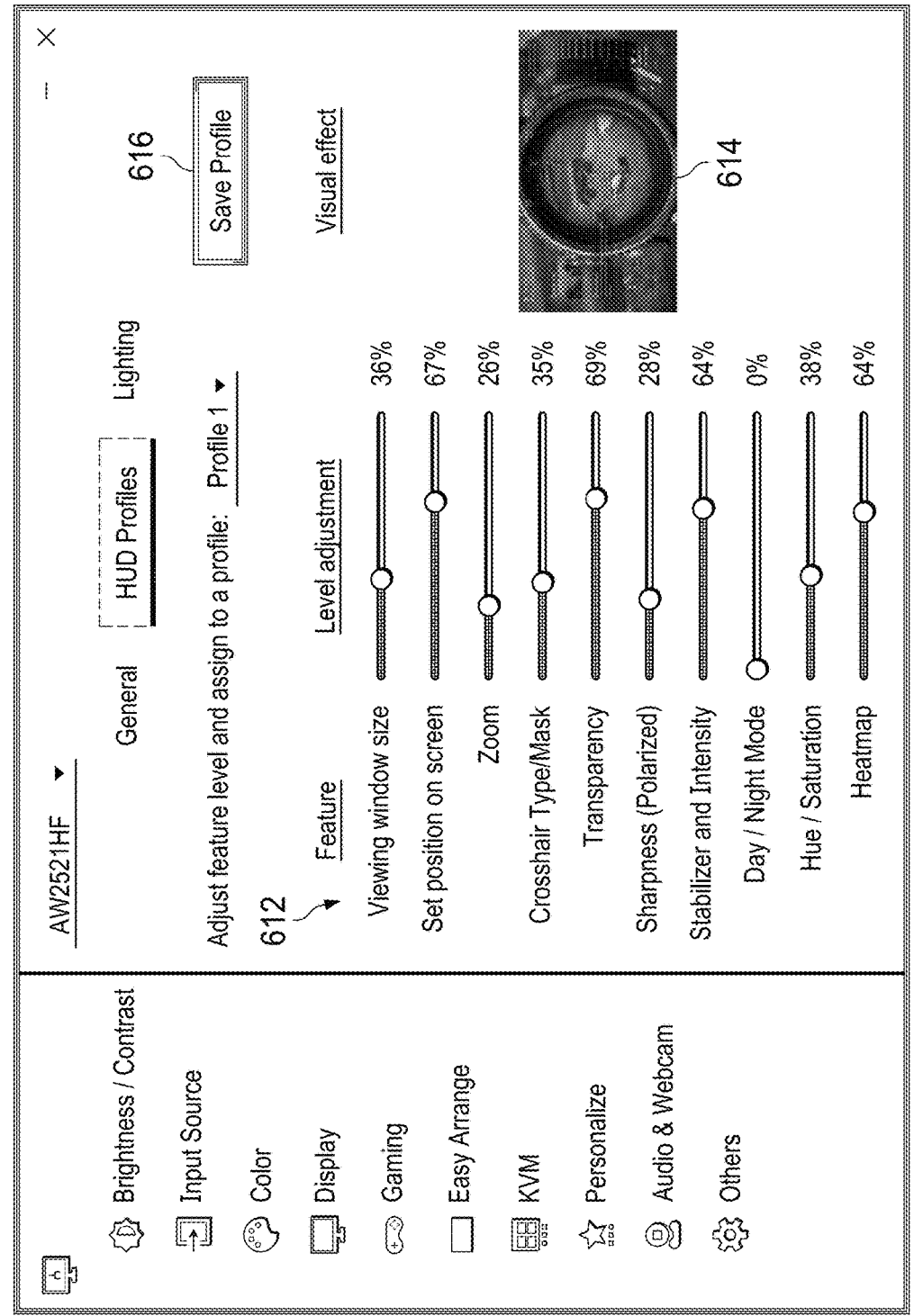

FIGS. 6A and 6B illustrate example user interface screens that may be generated by the visual effect management system and method to interact with the user according to one embodiment of the present disclosure. In particular, FIG. 6A illustrates a settings management screen 600, whiles FIG. 6B illustrates a visual effect management screen 610.

The settings management screen 600 may be generated by the system when a particular shortcut key is selected by the user. Although the present embodiment describes the use of a shortcut key, it is contemplated that other forms of user input may be used for accessing the settings management screen 600 by the user. For example, the system may be responsive to user input of a physical button or and OSD configured on the display 106 to generate the settings management screen 600.

The settings management screen 600 displays, among other things, the currently configured profiles 602 in the system. As shown in the example settings management screen 600, the user currently has three profiles 602 (e.g., Profile 1, Profile 2, and Profile 3) configured in the system, and each of these profiles 602 has an associated shortcut key 604 (e.g., F1, F2, and F3) assigned to them. Although the present embodiment describes the use of shortcut keys 604 to activate each profile 602, it is contemplated that other forms of user input may be used for activating each profile 602. For example, the system may use a physical button or an OSD configured on the display 106, gesture detection techniques, or gaze detection techniques, such as those described herein above.

The visual effects management screen 610 may be generated by the system to receive user input for adjusting various visual effects 612 associated with one particular profile 602. The visual effects management screen 610 may be accessed by the user in any suitable manner. In one embodiment, the visual effects management screen 610 may be accessed via selection of one profile indicator displayed on the settings management screen 600.

As shown, the visual effects management screen 610 provides for adjustment of several types of visual effects 612, such as a viewing window size, a set position on screen visual effect, a zoom visual effect, a crosshair type visual effect, a transparency visual effect, a sharpness visual effect, a stabilizer and intensity visual effect, a day/night mode visual effect, a hue/saturation visual effect, and a heatmap visual effect. Nevertheless, it should be appreciated that the visual effects management screen 610 may display and manage any suitable type of visual effect without departing from the spirit and scope of the present disclosure.

The visual effects management screen 610 may also provide a preview window 614 to provide a visual representation of how the currently set visual effects 612 may result when used on the display 106. When the user is finished adjusting the visual effects 612 for that particular profile 602, a save button 616 is provided to receive a request by the user to save the current visual effect settings for that profile 602 in a memory of the IHS 103 so that it may be retrieved at a later point in time.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A visual effects management system comprising:
a first application configured to generate a video stream using a computing device;
a monitor coupled to the computing device, the monitor configured to receive and display the video stream using a scalar device that is configured to convert the video stream into a format that is used to generate pixels on a display screen of the monitor, the scalar device configured in the monitor; and
a second application stored in at least one memory coupled to at least one processor of the computing device, the second application having program instructions that, upon execution by the at least one processor, cause the computing device to:
receive a request to select one visual effect profile from among a plurality of visual effect profiles, each of the visual effect profiles comprising information associated with one or more visual effects that are configured to be applied to a video stream; and
overlay the one or more visual effects onto the video stream using the scalar device.

2. The visual effects management system of claim 1, wherein the instructions, upon execution, further cause the computing device to receive the request via a configurable shortcut key configured on the computing device.

3. The IHS visual effects management system of claim 1, wherein the instructions, upon execution, further cause the computing device to receive the request via a hardcoded shortcut key on the computing device.

4. The visual effects management system of claim 1, wherein the instructions, upon execution, further cause the computing device to receive the request using a single shortcut key, each selection of the shortcut key causing the instructions to rotate through each of the plurality of visual effect profiles.

5. The visual effects management system of claim 1, wherein the instructions, upon execution, further cause the computing device to receive the request from an On Screen Display (OSD) configured on the monitor.

6. The visual effects management system of claim 1, wherein the instructions, upon execution, further cause the IHS to:
receive one or more parameters associated with a screen capability of the monitor; and
apply the visual effects based on the received parameters.

7. The visual effects management system of claim 1, wherein the instructions, upon execution, further cause the computing device to overlay the visual effects on the video stream using a display hardware Application Program Interface (API).

8. The visual effects management system of claim 1, wherein the instructions, upon execution, further cause the computing device to generate a user interface for receiving user input for adjusting the visual effects for the visual effect profile.

9. The visual effects management system of claim 1, wherein the visual effects each comprise at least one of a viewing window size, a set position on screen visual effect, a zoom visual effect, a crosshair type visual effect, a transparency visual effect, a sharpness visual effect, a stabilizer and intensity visual effect, a day/night mode visual effect, a hue/saturation visual effect, a heatmap visual effect, a dark area contrast visual effect, an image stabilization visual effect, a relative orientation visual effect, a waypoint guidance visual effect, a color remapping visual effect, and an overlay masking visual effect.

10. A visual effect management method comprising:
receiving a request to select one visual effect profile from among a plurality of visual effect profiles, each of the visual effect profiles comprising information associated with one or more visual effects that are configured to be applied to a video stream generated by a first application executed by a computing device; and
overlaying, using a second application executed by the computing device, the one or more visual effects onto video stream;
converting, using the second application, the video stream, using a scalar device configured in a monitor coupled to the computing device, into a format that is used to generate pixels on a display screen of the monitor; and
displaying the converted video stream on the display screen of the monitor.

11. The visual effect management method of claim 10, further comprising receiving the request via a shortcut key configured on the computing device, wherein the shortcut key is configurable on the computing device.

12. The visual effect management method of claim 10, further comprising receiving the request using a single shortcut key, each selection of the shortcut key causing the instructions to rotate through each of the plurality of visual effect profiles.

13. The visual effect management method of claim 10, further comprising receiving the request from an On Screen Display (OSD) configured on the monitor.

14. The visual effect management method of claim 10, further comprising:
receiving one or more parameters associated with a screen capability of the monitor; and
applying the visual effects based on the received parameters.

15. The visual effect management method of claim 10, further comprising overlaying the visual effects on the video stream using a display hardware Application Program Interface (API).

16. A hardware memory device having program instructions stored thereon that, upon execution by a processor of a monitor, cause the instructions to:
receive a request to select one visual effect profile from among a plurality of visual effect profiles, each of the visual effect profiles comprising information associated with one or more visual effects that are configured to be applied to a video stream generated by a first application executed by a computing device; and
overlay the one or more visual effects onto the video stream generated by an application using a second application executed by the computing device;
convert the video stream, using a scalar device configured in the display monitor, into a format that is used to generate pixels on the monitor; and
display the converted video stream on the monitor.

17. The hardware memory device of claim 16, wherein the instructions are further executed to receive the request via a shortcut key configured on the computing device, wherein the shortcut key is configurable on the computing device.

18. The hardware memory device of claim 16, wherein the instructions are further executed to:
receive one or more parameters associated with a screen capability of the monitor; and apply the visual effects based on the received parameters.

* * * * *